(No Model.)

E. F. MORSE.
VEHICLE SPRING.

No. 324,872. Patented Aug. 25, 1885.

Witnesses:
Charles H. White
J. W. Burdick

Inventor:
E. Fleet Morse.

United States Patent Office.

E. FLEET MORSE, OF ITHACA, NEW YORK.

VEHICLE-SPRING.

SPECIFICATION forming part of Letters Patent No. 324,872, dated August 25, 1885.

Application filed November 20, 1884. (No model.)

*To all whom it may concern:*

Be it known that I, E. FLEET MORSE, a citizen of the United States, residing at Ithaca, in the county of Tompkins and State of New York, have invented a new and useful Improvement in Vehicle-Springs, of which the following is a specification.

My invention relates to improvements in vehicle-springs which are subjected to torsion or torsion and flexion combined; and the objects of my invention are, first, to provide a spring of limited length that will admit of a large depression; second, to reduce the rocking of the body and cause it to be depressed by a one sided load as evenly as is desirable; and, third, to afford facilities for the proper adjustment of the springs to the various loads in the vehicle. I attain these objects by the mechanism illustrated in the accompanying drawings, in which—

Figure 1:
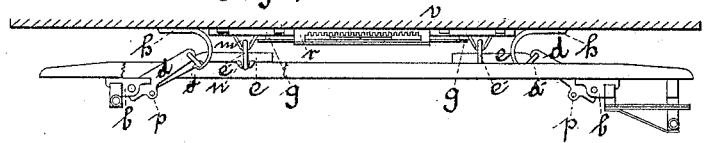
Figure 2:
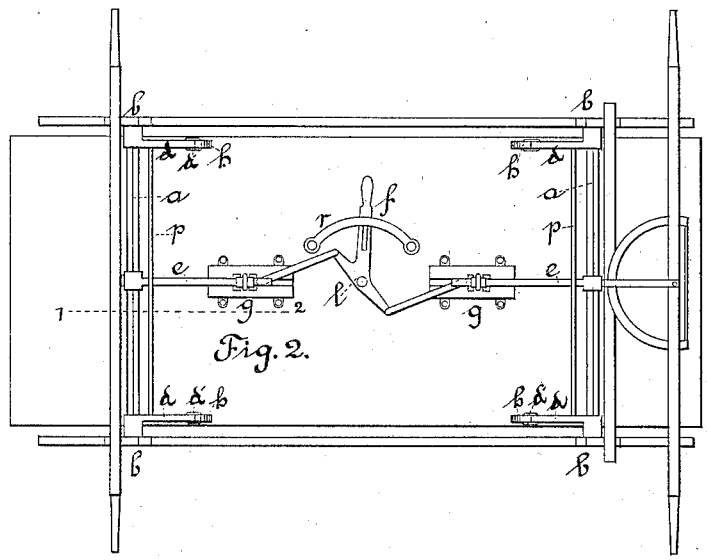
Figure 3:
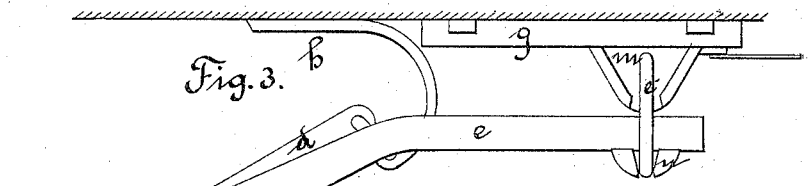
Figure 5:
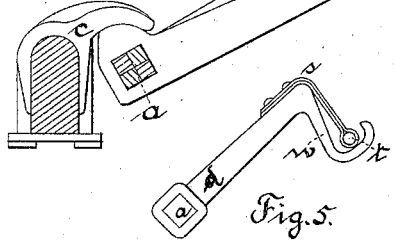
Figure 4:
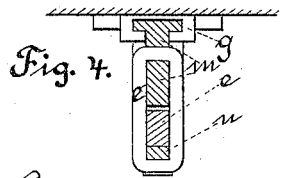
Figure 6:
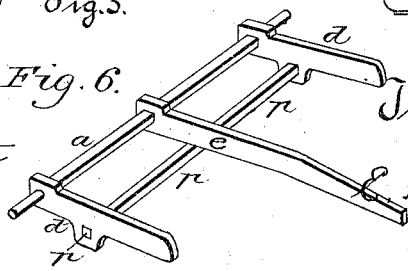

Figure 1 is a longitudinal elevation of the vehicle gearing and springs with a part of one of the side bars broken away. Fig. 2 is a view of the same from below. Fig. 3 is an enlarged sectional view of my spring on the line 1 2 without the supplementary spring to equalize the depression of the vehicle-body; and Fig. 4 is a detail end view of a portion of the adjustable parts of my spring. Fig. 5 is a view of an arm in the form I deem best adapted to be used with my springs. Fig. 6 is a perspective view of one of the springs with its arms and the rod $p$.

Similar letters refer to similar parts throughout the several views.

The springs, as represented in the drawings, li parallel to the rear axle, and consist, essentially, of four springs, each consisting of an elastic rod, $a$, or a group of such rods, as shown in Fig. 3, with rigidly-attached arms near their ends. As a matter of convenience of construction, together with some advantages, each pair of springs is made of the same continuous rod or rods with one arm, $e$, common to both. The springs are supported at or near each arm by bearings $b\ b$ and $c$, which are rigidly attached to the rear axle and to one of the front cross-bars for supporting the rear and front springs, respectively. All three arms $d\ d$ and $e$ of each pair of springs are connected by links $d'\ d'$ and $e'$, respectively, to the body $v$. While the arms $d\ d$, through the links $d'\ d'$ and supporters $h$, support one end of the body, the arms $e$, which are longer than the others, are supported by the body through links $e'$.

If the springs are not adjustable, the links $e'$ may connect arms $e$ directly to the body, but if adjustable the link $e'$ connects slide $n$, on which arm $e$ rests, to slide $m$, which is supported by and paired with longitudinal guides $g$ that are securely fastened to the body, and which allow the link $e'$ to be moved so as to change the effective length of arm $e$. The slides $m$ are connected by straps to opposite ends of lever $l$, which is pivoted to the bottom of the body. This lever is provided with a handle, $f$, for turning it and so adjusting the effective length of arm $e$. The handle also passes through the arc $r$ and holds lever $l$ in position by a tongue on it springing between the teeth on said arc.

Instead of the prismatic guides $g$ and lever $l$, the slide $m$ may be paired with a screw supported in bearings, so as to be free to turn. With this construction, simply turning the screw would move slide $m$ and thus change the effective length of arm $e$.

While like rods $a$ the equalizing-rods $p$ run parallel to the rear axle and have arms $d\ d$ rigidly attached to their ends, they differ in passing below and not being connected with arms $e$. Therefore while they do not assist in supporting the body, they tend to make the arms they connect turn the same amount and cause the two sides of the body to be depressed alike.

In the views so far described the arms were connected to the body in the usual way, but the manner I deem best adapted to my springs is shown in Fig. 5, where the body is supported by spring $s$, which is securely attached to the upper side of arm $d$, and is provided with an eye to receive pin $t$, which is securely attached to the body. The end of the arm $d$ is ∪-shaped, being bent down and partially around the eye, thus affording stops that limit the bending of the spring $s$ to the necessary amount. If the body lies between the arms $d\ d$, the pin $t$ can be attached directly to the body, but if it is over the arms, as in Fig. 2, the pin $t$ can be connected to the body by supporters $h$.

It may be remarked that the supporters can be provided with stops and the springs $s$ attached to them and pivoted to the arms. Also, if the pin $t$ is supported at one end only, the metal can extend across one end of the U-shaped part of the arm for the free end of the pin to strike against, and thus prevent any side motion of the body.

In operation the body of the vehicle with its load rests on the four arms $d\, d\, d\, d$, and tends to turn the springs in their bearings. In doing this the body drops and allows arm $e$ to turn through a less angle than arms $d$ turned through, on account of its greater length. This difference in the angular motion of arms $d$ and $e$ is resisted by the rod or rods $a$, whose angle of torsion must equal this difference. On account of the angular motion of arm $e$ the depression of the body is greater than it would be as a direct result of the angle of torsion of rods $a$. Further, the amount the body will be depressed under the same load and elastic rods is such a function of the lengths of arms $e$ and $d\, d$ that if the difference between their lengths be varied by changing the length of either arms $d\, d$ or $e$ the depression will be diminished or increased according as said difference is increased or diminished, thus in the former case adapting the springs to a greater load, and in the latter case to a lesser one. The effective length of arm $e$ is changed very conveniently by the lever $l$, as described. Arm $e$ being under the central part of the body, the force necessary to support it, and also the angular motion of this arm when the body is depressed, tend to depress both sides of the body alike; so, with an uneven load tending to depress one side of the body more than the other, these two actions of the spring tend to equalize the depressions of the two sides.

If desired, the equalizing force can be increased any amount by the addition of the elastic rod $p$, as described. On the other hand it can be reduced by attaching the rods $a$ to the arms at a distance from the axes about which they turn, when the rods will be subjected to flexion as well as torsion. As a torsion-spring, the action is the same as before, but as a flexion-spring it is the reverse so far as the equalizing force is concerned, for the arm $e$ now becomes a fulcrum over which the springs bend, and an excessive depression of one side tends to raise instead of depress the other.

The spring $s$, Fig. 5, by bending within the limits fixed by the stops, prevents the horizontal component of the circular motion of arm $d$ from interfering with the rectilinear depression of the body.

It may be remarked that the rods $a$ may be hung to the body and the arms connected to the vehicle-gearing substantially as they are now to the body.

What I claim is—

1. In a vehicle, a differential torsion-spring consisting of one or more elastic rods and attached arms, said arms having a different angular motion when the body is depressed, in virtue of which said rod or rods act as torsion-springs supporting the body, substantially as described.

2. In a vehicle, a differential spring consisting of an elastic rod provided with two short arms supporting the vehicle-body and a long arm supported by the vehicle-body, substantially as and for the purpose set forth.

3. An arm, $e$, of a vehicle-spring, in combination with a movable link, $e'$, adapted to change the effective length of arm $e$ and thus adjust the spring to the desired stiffness, substantially as set forth.

4. In a vehicle, a spring consisting of one or more elastic rods provided with one or more short arms supporting the body and a long arm supported by the body, in combination with suitable mechanism for adjusting the length of one of said arms, substantially as and for the purpose set forth.

5. In a vehicle torsion-spring, the combination of two or more rods grouped and acting together with two or more attached arms having a different angular motion when the body is depressed, whereby said rods act as torsion-springs supporting the body, substantially as described.

6. The slide $m$ and prismatic guide $g$, in combination with lever $l$ and connecting-straps for adjusting the spring, substantially as described.

7. The elastic rod $p$, connecting the supporting-arms of a vehicle-spring and tending to make them turn together and equalize the depression of the body, substantially as described.

8. The spring $s$, securely attached to arm $d$ at one end and to pin $t$ at the other, in combination with stops to limit the bending of said spring, substantially as and for the purpose set forth.

9. A vehicle torsion-spring consisting of one or more elastic rods and three attached arms, two of said arms having a different angular motion from the third when the body is depressed, in virtue of which said rod or rods act as torsion-springs supporting the body, substantially as described.

E. FLEET MORSE.

Witnesses:
 CHAS. H. WHITE,
 D. W. BURDICK.